United States Patent [19]
Craver et al.

[11] Patent Number: 4,511,609
[45] Date of Patent: Apr. 16, 1985

[54] MULTILAYER TRASH BAG FILM

[75] Inventors: Joseph N. Craver, Flossmoor; Jerome T. Horner, Indian Head Park, both of Ill.

[73] Assignee: Union Carbide Corporation, Danbury, Conn.

[21] Appl. No.: 429,184

[22] Filed: Sep. 30, 1982

[51] Int. Cl.³ .................. B32B 7/02; B32B 27/08; B28B 3/20
[52] U.S. Cl. .................. 428/35; 264/176 R; 428/218; 428/516
[58] Field of Search .............. 428/516, 35, 212, 218, 428/515; 383/109; 264/176 R

[56] References Cited

U.S. PATENT DOCUMENTS

| | | |
|---|---|---|
| 3,694,524 | 9/1972 | Tinger et al. ............ 260/897 |
| 4,000,234 | 12/1976 | Pilgrim et al. ............ 264/95 |
| 4,076,698 | 2/1978 | Anderson et al. ............ 526/348.6 |
| 4,126,262 | 11/1978 | Thompson et al. ............ 428/516 |
| 4,303,710 | 11/1981 | Bullard et al. ............ 428/516 |
| 4,346,834 | 8/1982 | Mazumdar ............ 428/35 |
| 4,356,221 | 10/1982 | Anthony et al. ............ 428/35 |
| 4,357,191 | 11/1982 | Bullard et al. ............ 428/35 |
| 4,364,981 | 11/1982 | Horner et al. ............ 428/35 |
| 4,367,256 | 1/1983 | Biel ............ 428/218 |
| 4,367,841 | 1/1983 | Mazumdar ............ 428/35 |
| 4,390,573 | 6/1983 | Bullard et al. ............ 428/35 |
| 4,399,173 | 8/1983 | Anthony et al. ............ 428/35 |
| 4,399,180 | 8/1983 | Briggs et al. ............ 428/218 |
| 4,418,114 | 11/1983 | Briggs et al. ............ 428/516 |
| 4,444,828 | 4/1983 | Anthony et al. ............ 428/518 |

OTHER PUBLICATIONS

Kurtz et al., Ser. No. 210,593, filed Nov. 26, 1980.
Horner et al., Ser. No. 108,281, filed Dec. 28, 1979.
Fraser et al., Ser. No. 164,237, filed Jun. 30, 1980.
Fraser et al., Ser. No. 246,914, filed Mar. 23, 1981.
Anthony et al., Ser. No. 343,549, filed Jan. 28, 1982.

Primary Examiner—George F. Lesmes
Assistant Examiner—William M. Atkinson
Attorney, Agent, or Firm—John C. LeFever; Real J. Grandmaison

[57] ABSTRACT

A multilayer plastic film suitable for use in the manufacture of garbage and trash bags wherein the film comprises a first outer layer of low pressure, low density polyethylene, a core layer of high pressure, low density polyethylene, and a second outer layer of high pressure, low density polyethylene.

14 Claims, No Drawings

MULTILAYER TRASH BAG FILM

This invention relates to a multilayer plastic film, and more particularly, to a multilayer plastic film suitable for use in the manufacture of garbage and trash bags.

In general, plastic garbage and trash bags for bulk waste material may be produced in film form from various polymers such as polyethylene. The films used for such bags should desirably possess high strength characteristics such as puncture toughness and tensile strength. Another desirable property of plastic bags is low manufacturing cost. It will be recognized that the required quantity of raw material may be reduced by use of polyethylene film having the previously mentioned high strength characteristics and, in part for this reason, multiple layer plastic films have been used to manufacture garbage bags.

With the introduction of linear low density polyethylenes made by the low pressure processes, attempts have been made to substitute this material for film applications in place of conventional highly branched low density polyethylenes made by high pressure processes. The reason for these efforts is that low pressure, low density polyethylene is recognized as being tougher and stronger than high pressure, low density polyethylene.

The prior art polyethylene film-type bags have thus been characterized by either limited strength properties with relatively low extruder power requirement and low extruder head pressure on one hand, or characterized by high strength properties and relatively high extruder power requirement and high extruder head pressure on the other hand.

In addition, polyethylene film for the production of consumer garbage and trash bags is generally prepared in the thickness range of between about 1.2 mils and about 3.0 mils. As earlier indicated, it is customary for low density polyethylene, produced by the standard high pressure process, to be used as the basic polymer or raw material for this product because of its relatively low cost, good physical properties, ease of extrusion at high rates, good heat seal strength, and ability to be readily converted into the finished product.

There is, however, a continuous need for strong films for this application which will be resistant to damage by puncture of yielding under stress. A strong film is not only desirable from the standpoint that the finished bag is more serviceable in the end-use, but also in that a thin film can be used and still meet the necessary strength requirements, thus providing a better cost-performance relationship for the consumer.

It is also desirable to obtain a thin bag that will function as a trash and garbage container at a performance level generally requiring a thick bag to enable the manufacture to produce the bag at a higher rate such that increased linear feet per unit of time results in lower cost and less resin is required per bag. Previous attempts employing linear low density polyethylene copolymers produced by the low pressure polymerization process to obtain the aforementioned benefits have been restricted due to their lower extensional viscosity i.e., melt strength, after leaving the extrusion die, and the bubble stability of the blown film is lower than with high pressure, low density polyethylene. As a result, the ability to air cool the extrudate of low pressure, low density polyethylene is lessened and consequently the output in pounds per hour is lower.

In accordance with this invention there is provided a multilayer polyethylene film processing satisfactory puncture toughness and tensile strength which may be produced at rates significantly greater than those previously possible.

The multilayer film of this invention is eminently suitable for use in the manufacture of garbage and trash bags which, in one embodiment, comprises a first outer layer of a low pressure, low density polyethylene; a core layer of high pressure, low density polyethylene; and a second outer layer of high pressure, low density polyethylene. It has been found that the multilayer film of this invention has physical properties, such as puncture toughness and tensile strength, which are improved over those of conventional multilayer films made from high pressure, low density polyethylene in all layers thereof or from blends of high pressure, low density polyethylene and low pressure, low density polyethylene, and which enable production rates which are substantially higher than those achieved with conventional film compositions.

Accordingly, it has been found that a multilayered, coextruded film composition comprising low pressure, low density polyethylene as the first outer layer, and high pressure, low density polyethylene as the core layer and the second outer layer of the co-extruded film results in a film having the desired level of puncture toughness energy of at least about 10 inch-pounds, and in a film which may be produced at rates of between 1700 and 1800 pounds per hour. Other physical properties of the multilayer film composition of this invention have been found to be comparable or superior to those of conventional multilayer film compositions.

The multilayered structure herein, containing high pressure, low density polyethylene as a core layer and as a second outer layer, is particularly desirable in order to gain freedom from melt fracture of the layer of low pressure, low density polyethylene at high output rates, and in order to aid in increasing the melt strength of the extrudate in order to improve bubble or melt cooling at higher output rates.

The low pressure, low density polyethylene comprising the first outer layer of the multilayer film of this invention comprises copolymers formed from ethylene and a comonomer selected from butene-1, pentene-1, hexene-1, heptene-1 and octene-1, and mixtures thereof. These copolymers may have a melt index of between about 0.5 and about 3.0 decigrams per minute. However, it is preferred that the copolymers have a melt index of between about 0.6 and about 1.2 decigrams per minute because as the melt index decreases, viscosity increases and extrusion becomes more difficult, thereby requiring more powerful extruders; and, further, as melt index increases, such also results in a lowering of the physical properties of the film, notably tensile strength and puncture toughness energy. In addition, these copolymers may have a density of between about 0.916 and about 0.930 grams per cubic centimeter. However, as the density increases, machine direction tear strength is found to lessen. Thus, it is preferred that the copolymers have a density of between about 0.916 and about 0.922. Likewise, it is preferred that the low pressure, low density polyethylene comprise a copolymer of ethylene and butene-1.

The high pressure, low density polyethylene employed in this invention may have a melt index of between about 0.5 and about 5.0 decigrams per minute, and a density of between about 0.916 and about 0.930.

However, it is preferred that the high pressure, low density polyethylene have a melt index of between about 1 to 3 decigrams per minute and a density of between about 0.916 and about 0.924.

The desired physical properties and improved production rates provided by the multilayer film composition of this invention are also predicated upon the thickness ratio of low pressure, low density polyethylene layer to high pressure, low density polyethylene layers which is a major contributing factor. More specifically, it has been found that by decreasing the thickness ratio of the low pressure, low density polyethylene layer with a corresponding increase in the thickness ratio of the high pressure, low density polyethylene layers the increased melt strength and bubble stability of the extrudate are obtained. Therefore, in order to maintain high production rates and retain desired physical properties in the final product, a preferred layer: layer thickness ratio of 1:2 for the low pressure, low density polyethylene and the high pressure, low density polyethylene layers, respectively, should be employed. However, the layer: layer thickness ratio for the first outer layer to the core layer and second outer layer may be between about 1:2 and about 1:3.

Further, the multilayer film composition of this invention may comprise a first outer layer of the aforementioned low pressure, low density polyethylene to which a colorant selected from a pigment or dye, such as green or black, may be added; a core layer comprising one or more layers wherein at least one of the layers comprises high pressure, low density polyethylene; and a second outer layer comprising high pressure, low density polyethylene to which a colorant has been added. When so constructed, it is preferred that said first outer layer comprise between about 25 percent and about 33 percent of the total thickness of the multilayer film, and said core layer(s) and said second outer layer comprise the remaining thickness of the total thickness of the multilayer film.

Further still, the multilayer film composition of this invention may comprise a first outer layer of a low pressure, low density polyethylene; a core layer of high pressure, low density polyethylene, or a blend of high pressure, low density polyethylene and low pressure, low density polyethylene; and a second outer layer of high pressure, low density polyethylene, or a blend of high pressure, low density polyethylene and low pressure, low density polyethylene. When so constructed, it is preferred that the core layer contain less than about 10 percent by weight of the low pressure, low density polyethylene. Likewise, it is preferred that the second outer layer contain less than about 10 percent by weight of the low pressure, low density polyethylene.

The multilayer film composition of this invention is preferably prepared by simultaneously coextruding one or more layers of low pressure, low density polyethylene and at least two layers of high pressure, low density polyethylene. Coextrusion of the multilayer film composition has been found to result in substantial reduction of melt fracture events due to the presence of the high pressure, low density polyethylene which contributes melt strength to the extruded product and allows higher output rates due to improved air cooling properties. In addition, extrusion through narrow die gaps on the order of 30 to 50 mils provides multilayer films having more balanced physical properties. That is, the machine direction properties of the films are not vastly different from the transverse direction properties of the films. This is particularly important in garbage and trash bag production where each bag is generally side-sealed such that the bottom of the bag is the side fold of the blown film tubing. In this event, the transverse direction of the blown film becomes the lift direction of the bag.

The total thickness of the multilayer film is generally between about 1 mil and about 3 mils. Substantially thinner films would usually not be suitable because the strength properties of the film would be unacceptably low for use as a trash or garbage bag. Films substantially thicker than 3 mils are not preferred since the additional strength associated with thicker material is ordinarily not required for trash/garbage bag usage. A further disadvantage of thicker films would be difficulty in handling and tying the bag open end. A preferred balance of these opposing considerations is a film having a thickness of between about 1.0 and 1.5 mils.

Illustrative, non-limiting examples of the features and practice of the invention are set out below. The parts and percentages set forth herein refer to parts by weight and percentages by weight, respectively, unless specifically stated otherwise.

In the following examples, the sample multilayer films were formed by co-extrusion of the film layers through a tubular die. Further, the multilayer film examples represented in Table I comprised the following material compositions having the following properties. The low pressure, low density polyethylene comprised a copolymer of ethylene and butene-1 having a melt index of about 0.8 decigrams per minute and a density of about 0.920 grams per cubic centimeter. The high pressure, low density polyethylene had a melt index of about 2.0 decigrams per minute and a density of about 0.918 grams per cubic centimeter. The thickness ratio of the low pressure, low density polyethylene layer to that of the high pressure, low density polyethylene layers was about 1:3. The low pressure, low density polyethylene layer was supplied by a 4½ inch single screw extruder at a screw speed of about 64 r.p.m. at a head pressure of about 7200 p.s.i. The high pressure, low density polyethylene layers were supplied by a 6 inch single screw machine at a screw speed of about 80 r.p.m. at a head pressure of about 3200 p.s.i. The apparatus useful in forming the multilayer films of this invention is more fully disclosed in U.S. Pat. No. 4,348,349 issued Sept. 7, 1982. The discharge from the die was blown into a multilayer film having a thickness of about 1.5 mils.

Each formulation was prepared at a production run speed of about 220 feet per minute wherein the rates averaged about 1750 pounds per hour. Table I summarizes the formulations employed for 16 production runs.

TABLE 1

| RUN NO. | LAYER | FORMULATIONS | | MASTERBATCH | | |
|---|---|---|---|---|---|---|
| | | LPLDPE | HPLDPE | I | II | III |
| 1 | 1st outer layer | 88.0 | | 3.6 | 8.4 | |
| | core layer and 2nd outer layer | 3.3 | 94.7 | | | 2.0 |
| 2 | 1st outer layer | 90.0 | | 6.0 | 4.0 | |
| | core layer and 2nd outer layer | 3.3 | 94.7 | | | 2.0 |
| 3 | 1st outer layer | 90.0 | | 3.0 | 7.0 | |
| | core layer and 2nd outer layer | 3.3 | 94.7 | | | 2.0 |
| 4 | 1st outer layer | 88.0 | | 7.2 | 4.8 | |
| | core layer and | | | | | |

TABLE 1-continued

FORMULATIONS

| RUN NO. | LAYER | LPLDPE | HPLDPE | MASTERBATCH I | MASTERBATCH II | MASTERBATCH III |
|---|---|---|---|---|---|---|
|  | 2nd outer layer | 3.3 | 94.7 |  |  | 2.0 |
| 5 | 1st outer layer core layer and | 90.0 |  | 3.0 | 7.0 |  |
|  | 2nd outer layer | 3.3 | 93.7 |  |  | 3.0 |
| 6 | 1st outer layer core layer and | 90.0 |  | 6.0 | 4.0 |  |
|  | 2nd outer layer | 3.3 | 93.7 |  |  | 3.0 |
| 7 | 1st outer layer core layer and | 88.0 |  | 7.2 | 4.8 |  |
|  | 2nd outer layer | 3.3 | 93.7 |  |  | 3.0 |
| 8 | 1st outer layer core layer and | 88.0 |  | 3.6 | 8.4 |  |
|  | 2nd outer layer | 3.3 | 93.7 |  |  | 3.0 |
| 9 | 1st outer layer core layer and | 90.0 |  | 3.0 | 7.0 |  |
|  | 2nd outer layer | 5.5 | 92.5 |  |  | 2.0 |
| 10 | 1st outer layer core layer and | 90.0 |  | 6.0 | 4.0 |  |
|  | 2nd outer layer | 5.5 | 92.5 |  |  | 2.0 |
| 11 | 1st outer layer core layer and | 88.0 |  | 7.2 | 4.8 |  |
|  | 2nd outer layer | 5.5 | 92.5 |  |  | 2.0 |
| 12 | 1st outer layer core layer and | 88.0 |  | 3.6 | 8.4 |  |
|  | 2nd outer layer | 5.5 | 92.5 |  |  | 2.0 |
| 13 | 1st outer layer core layer and | 90.0 |  | 6.0 | 4.0 |  |
|  | 2nd outer layer | 5.5 | 91.5 |  |  | 3.0 |
| 14 | 1st outer layer core layer and | 90.0 |  | 3.0 | 7.0 |  |
|  | 2nd outer layer | 5.5 | 91.5 |  |  | 3.0 |
| 15 | 1st outer layer core layer and | 88.0 |  | 3.6 | 8.4 |  |
|  | 2nd outer layer | 5.5 | 91.5 |  |  | 3.0 |
| 16 | 1st outer layer core layer and | 88.0 |  | 7.2 | 4.8 |  |
|  | 2nd outer layer | 5.5 | 91.5 |  |  | 3.0 |

In TABLE 1, LPLDPE means low pressure low density polyethylene; HPLDPE means high pressure, low density polyethylene; the MASTERBATCH I composition consisted of pigments, antiblock and slip additives, a HPLDPE carrier, and a thermal stabilizer; the MASTERBATCH II composition was the same as Masterbatch I but with a different pigment; and the MASTERBATCH III composition consisted of a black pigment, antiblock and slip additives, and HPLDPE carrier, and a thermal stabilizer.

As shown in the Table I formulations, the composition of the core layer and the second outer layer comprised high pressure, low density polyethylene containing small amounts, i.e. 3.3 to 5.5 percent, of low pressure, low density polyethylene. The source of the low pressure, low density polyethylene was the reclaim of scrap film and bags which was salvaged from earlier production runs and which had been reprocessed into raw material.

The physical properties of the sample formulations of Runs 1-16 were measured, averaged, and are shown in Table II. For comparison, two control formulations were evaluated under the same conditions herein. The Control 1 composition comprised a first outer layer and a core layer pigmented green containing about 85% HPLDPE, 10% LPLDPE, and 5% Masterbatch I. The second outer layer contained about 98% HPLDPE, and 2% Masterbatch III. The thickness ratio of the green layers to the black film layer was about 2:1. The Control 2 composition comprised a first outer layer and a core layer pigmented green wherein the first outer layer and the core layer comprised 95% LPLDPE and about 5% Masterbatch I. The second outer layer comprised about 78% HPLDPE, about 20% LPLDPE, and about 2% Masterbatch III. The thickness ratio of the green layers to the black film layer was about 2:1. The property values for the Control 1 composition and the Control II composition are for the average of about 30 and 102 samples, respectively.

TABLE II

| PROPERTY | UNIT | CONTROL 1 | CONTROL 2 | RUNS 1-16 |
|---|---|---|---|---|
| Puncture toughness load | lbs | 7.93 | 9.59 | 8.53 |
| Puncture toughness energy | in-lbs | 7.58 | 16.92 | 10.6 |
| Tensile Strength, MD | psi | 3086 | 3674 | 3157 |
| Tensile Strength, TD | psi | 2340 | 3085 | 2642 |

MD means machine direction
TD means transverse direction

For the results shown in Table II, the following test criteria were used. Tensile strength was measured by ASTM D 882 method A.

Puncture toughness is a test originated to evaluate the relative resistance of a film to being punctured. There is no ASTM standard. Basically, a ¾ inch round steel plunger is pushed through a clamped film specimen at a speed of 20 inches per minute using a modified Instron Tester. The load to puncture of the film specimen is recorded in pounds and the energy to puncture is the integrated area under the load-elongation curve and is recorded in inch-pounds (inch-lbs).

Melt index was determined by ASTM D1238-Condition E-measured at 190° C. and reported as grams per 10 minutes.

From the results shown in Table II, it can be seen that the multilayer film composition of the present invention as represented by Runs 1-16 provides physical properties which are superior to those of the Control 1 composition used in the manufacture of trash/garbage bags. Moreover, no melt fracture events were experienced during production of the multilayer film composition of this invention and the composition could be produced stably at rates of between 1700 and 1800 pounds per hour. By comparison, the Control 2 composition could only be produced at a rate about 15% slower than that of Runs 1-16 due to the poorer melt strength of the film containing the higher amount of low pressure resin.

It is also to be noted that the multilayer film compositions of this invention may contain conventional pigments, anti-oxidants, slip agents and anti-block agents as well as small amounts, for example, up to about 5 percent by weight of a resin component present as the vehicle or carrier for the aforementioned materials as may be provided from a masterbatch thereof.

Although preferred embodiments of this invention have been described in detail, it is contemplated that modifications thereof may be made and that some features may be employed without others, all within the spirit and scope of the invention. For example, although the films described in the foregoing examples were prepared by blown film extrusion, other preparative methods may be used as, for example, slot cast extrusion.

We claim:

1. A method of preparing a multilayer film comprising coextruding a first outer layer consisting essentially of low pressure, low density polyethylene copolymer formed from ethylene and a comonomer selected from butene-1, pentene-1, hexene-1, heptene-1 and octene-1, and mixtures thereof, said copolymer having a melt index of between about 0.5 and about 3.0 decigrams per minute, and a density of between about 0.916 and about 0.930 grams per cubic centimeter, a core layer consisting essentially of high pressure, low density polyethylene, and a second outer layer consisting essentially of high pressure, low density polyethylene, said high pressure, low density polyethylene having a melt index of between about 0.5 and about 5.0 decigrams per minute and a density of between about 0.916 and about 0.930 grams per cubic centimeter.

2. A multilayer film consisting essentially of a first outer layer of low pressure, low density polyethylene copolymer formed from ethylene and a comonomer selected from butene-1, pentene-1, hexene-1, heptene-1 and ocetene-1, and mixtures thereof, said copolymer having a melt index of between about 0.5 and about 3.0 decigrams per minute, and a density of between about 0.916 and about 0.930 grams per cubic centimeter, a core layer of high pressure, low density polyethylene, and a second outer layer of high pressure, low density polyethylene, said high pressure, low density polyethylene having a melt index of between about 0.5 and about 5.0 decigrams per minute and a density of between about 0.916 and about 0.930 grams per cubic centimeter.

3. A multilayer film as in claim 1 wherein said copolymer has a melt index of between about 0.6 and about 1.2 decigrams per minute.

4. A multilayer film as in claim 1 wherein said high pressure, low density polyethylene has a melt index of between about 1 to 3 decigrams per minute and a density of between about 0.916 and about 0.924 grams per cubic centimeter.

5. A multilayer film as in claim 1 wherein said low pressure, low density polyethylene comprises a copolymer of ethylene and butene-1.

6. A multilayer film as in claim 1 wherein the thickness ratio of said first outer layer to the combined thickness of said core layer and said second outer layer is between about 1:2 and about 1:3.

7. A multilayer film as in claim 1 wherein the thickness ratio of said first outer layer to the combined thickness of said core layer and said second outer layer is about 1:2.

8. A multilayer film as in claim 1 including a colorant selected from a pigment or dye.

9. A multilayer film as in claim 1 wherein the total thickness of said multilayer film in between about 1 mil and about 3 mils.

10. A multilayer film as in claim 1 wherein the total thickness of said multilayer film is between about 1.0 mils and about 1.5 mils.

11. A bag formed from the multilayer film of claim 1.

12. A multilayer film consisting essentially of a first outer layer of low pressure, low density polyethylene copolymer formed from ethylene and a comonomer selected from butene-1, pentene-1, hexene-1, heptene-1 and octene-1, and mixtures thereof, said copolymer having a melt index of between about 0.5 and about 3.0 decigrams per minute, and a density of between about 0.916 and about 0.930 grams per cubic centimeter, a core layer comprising one or more film layers wherein at least one of said film layers consists essentially of high pressure, low density polyethylene, and a second outer layer consisting essentially of high pressure, low density polyethylene, said high pressure, low density polyethylene having a melt index of between about 0.5 and about 5.0 decigrams per minute and a density of between about 0.916 and about 0.930 grams per cubic centimeter.

13. A multilayer film as in claim 12 wherein said first outer layer comprises between about 25 percent and about 33 percent of the total thickness of said multilayer film.

14. A bag formed from the multilayer film of claim 12 or 13.

* * * * *